Patented Aug. 9, 1932

1,871,428

UNITED STATES PATENT OFFICE

ALBERT KELVIN SMITH, OF SHAKER HEIGHTS VILLAGE, OHIO, ASSIGNOR TO THE DOW CHEMICAL COMPANY, OF MIDLAND, MICHIGAN, A CORPORATION OF MICHIGAN

FLAKE MAGNESIUM CHLORIDE AND METHOD OF MAKING SAME

No Drawing. Application filed May 25, 1928. Serial No. 280,663.

As is well known, the hydrated form of magnesium chloride ($MgCl_2 6H_2O$), as ordinarily manufactured in the form of crystals or the equivalent, has a pronounced tendency to cake, the particles coalescing and forming a hard mass which renders the material difficult to remove from drums or other containers in which it may be packed or to handle for any purpose.

In United States Patent 1,593,440 there is disclosed a method of producing magnesium chloride in the form of particles having a composition corresponding to from 99% to 105% $MgCl_2 6H_2O$ which possess non-caking properties.

The preparation heretofore of hydrated magnesium chloride of less water content than that corresponding to the 105% $MgCl_2 6H_2O$ product described in the patent referred to has been difficult and expensive.

I have discovered, however, that magnesium chloride may be produced in divided solid form having not only non-caking properties, but containing markedly less crystal water than the above mentioned product. I am, in fact, able to produce this product in that form over the range from a content corresponding to $MgCl_2 6H_2O$ to a content corresponding to $MgCl_2 4H_2O$ in a simple economical manner. To the accomplishment of the foregoing results, the invention then consists of the steps and product hereinafter fully described and particularly pointed out in the claims, the following description illustrating but one of various ways in which the principle of the invention may be used.

I concentrate magnesium chloride solution by boiling to an atmospheric boiling point above 169° C. The so concentrated solution may then be cooled and solidified in a comminuted form in any practicable manner. I prefer, however, to chill in a thin layer upon a water-cooled, revolving, cylindrical drum from which, after solidification, the chloride may be scraped off by a suitable knife in the form of hard, thin, glass-like flakes.

Any desired composition within the range indicated may be readily secured by stopping the concentration at a boiling point corresponding to that composition. The boiling point of the $4H_2O$ chloride is, as stated, 193° C. Its freezing point is 180° C. The boiling point of the chloride corresponding to 105% $MgCl_2 6H_2O$ i. e. having a $MgCl_2$ content of approximately 49% is in the neighborhood of 169° C., and the temperature of complete solidification is approximately 117° C. When flaking solutions ranging in composition between the $6H_2O$ and the $4H_2O$ salts complete solidification will occur at approximately 117° C. The one exception will be noted when flaking a chloride corresponding to $MgCl_2 4H_2O$ i. e. having a $MgCl_2$ content of substantially 57% in which case the partial and final solidification points nearly merge at 180° C.

The product made in this manner, whether flaked or granulated, will take on a glass-like finish and have a hardness greater than that corresponding to the normal hexahydrate salt or the product made in accordance with the above cited patent, and will contain more magnesium chloride per unit weight and volume. It will have a decreased tendency to cake in storage, even at temperatures above that at which caking may occur with packaged hydrated magnesium chloride produced by the patented process previously referred to.

It is not deemed necessary to illustrate the manner in which the flaking or granulating or other method of comminuting is achieved, but I find it preferable to pick the molten salt up in a thin layer on the surface of a revolving metal drum which is cooled by passing a current of water over its inner surface and to scrape off the chloride after solidification upon the drum. The molten chloride may, however, be atomized in a blast of air or other aeriform fluid or by spraying into a cooling chamber or the like, or it may be crushed or granulated in any other way and a product will be obtained measurably superior to the chloride heretofore available on the market in its non-caking characteristics combined with the higher content of magnesium per unit volume and weight having the advantage of requiring fewer packages per ton and correspondingly reduced storage space therefore. Such a product may obviously be handled more conveniently and economically whether it be utilized directly in a subsequent manufacturing operation or is later dehydrated in order to form the anhydrous salt for use, for instance, in an electrolytic process for the production of metallic magnesium.

The dehydration attained by evaporating the molten hydrated chloride at temperatures above 169° C., particularly by carrying the concentration by boiling to a finishing temperature of 193° C., whereby the $4H_2O$ salt is obtained, is more economical than would be the removal of an equivalent amount of water by drying a solid form of the normal hexahydrated salt in a current of hot air or the like. It is particularly advantageous to prepare a partially dehydrated product containing approximately four molecules of water of crystallization by evaporating the molten hydrated salt in the manner herein described as a preliminary step in a process for the production of anhydrous magnesium chloride since the subsequent steps of completing the dehydration of the salt may be carried out with smaller-sized equipment and at a more rapid rate than when the normal hexahydrated salt is to be dried directly under conditions to avoid fusion thereof.

It is, indeed, possible to concentrate to a still lower water content than that corresponding to $MgCl_2.4H_2O$ by continuing the concentration by boiling to a higher temperature than 193° C., but since the temperature of incipient solidification then tends to approach the boiling point, it becomes increasingly difficult to maintain the molten condition between the concentration kettle and its application to the flaker.

Other modes of applying the principle of my invention may be employed instead of the one explained, change being made as regards the process herein disclosed or the materials employed in carrying out the process, provided the step or steps stated by any of the following claims or the equivalent of such stated step or steps be employed.

I therefore particularly point out and distinctly claim as my invention:—

1. In a process for dehydrating magnesium chloride, the step which consists in evaporating a molten relatively highly hydrated magnesium chloride until a boiling point temperature approximating 193° C. is attained.

2. In a process for dehydrating magnesium chloride, the steps which consist in evaporating a molten relatively highly hydrated magnesium chloride until a boiling point temperature approximating 193° C. is attained, and then solidifying the molten salt by mechanical means in the form of small particles.

3. In a process for dehydrating magnesium chloride, the steps which consist in evaporating a molten relatively highly hydrated magnesium chloride until a boiling point temperature of approximately 193° C. is attained, and then flaking the product.

4. In a process for dehydrating magnesium chloride, the steps which consist in evaporating a molten relatively highly hydrated magnesium chloride until a boiling point temperature of approximately 193° C. is attained, flaking the product, and then further dehydrating the flake particles.

5. In a process for dehydrating magnesium chloride, the steps which consist in evaporating a molten relatively highly hydrated magnesium chloride until a boiling point temperature of approximately 193° C. is attained, solidifying and comminuting the product, and then further dehydrating the solid particles.

6. In a process for dehydrating magnesium chloride, the step which consists in evaporating a molten hydrated magnesium chloride until the boiling point thereof is raised to a temperature between 180° C. and 193° C.

7. In a process for dehydrating magnesium chloride, the steps which consist in evaporating a molten hydrated magnesium chloride until the boiling point thereof is raised to a temperature between 180° C. and 193° C., and then chilling the molten salt and subdividing the same by mechanical means to form small particles.

8. In a process for dehydrating magnesium chloride, the steps which consist in evaporating a molten hydrated magnesium chloride until the boiling point thereof is raised to a temperature between 180° C. and 193° C., and then flaking the molten salt.

Signed by me, this 22nd day of May, 1928.

ALBERT KELVIN SMITH.